Figures 1, 2:
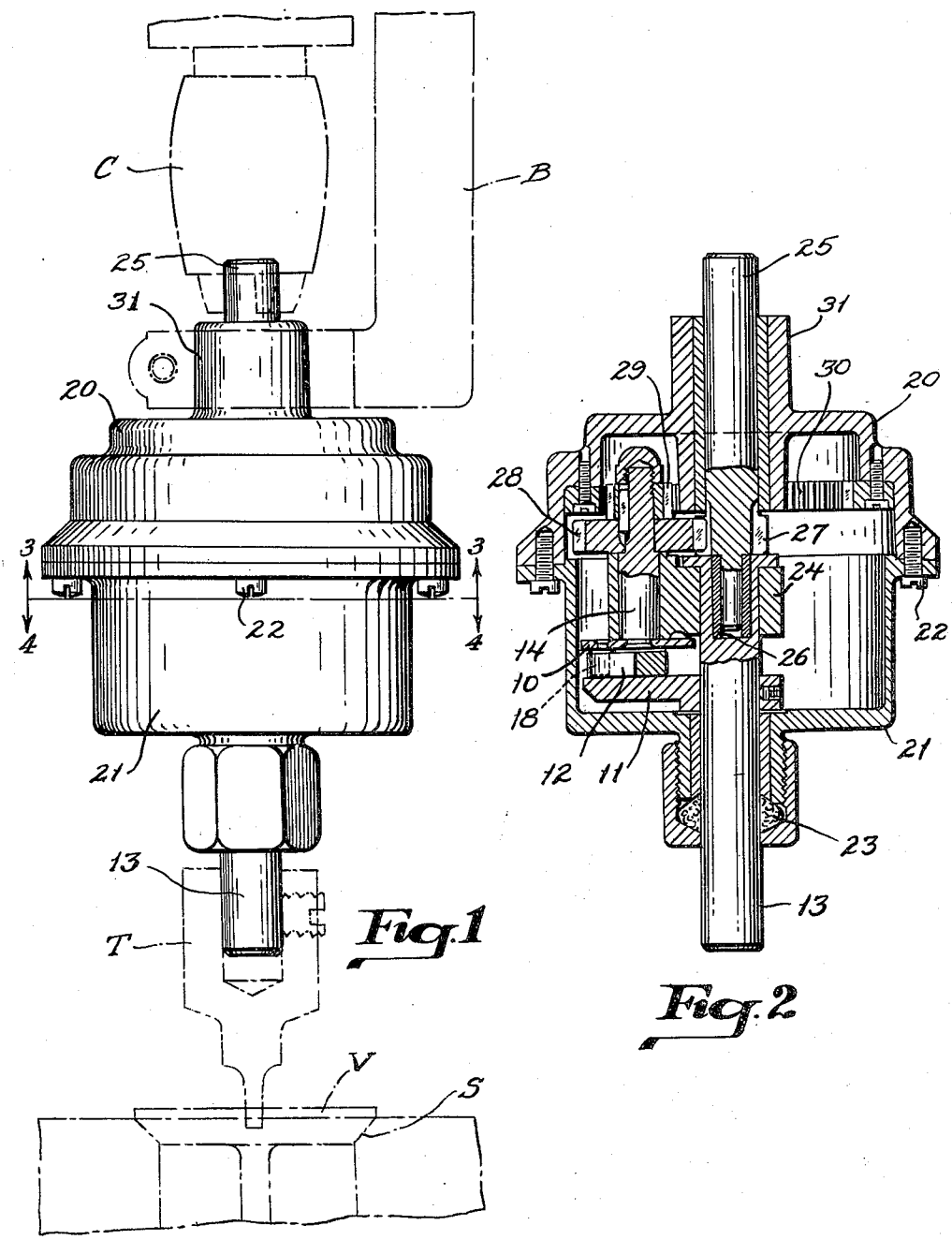

Jan. 16, 1951     A. H. HEINRICH     2,538,620
MECHANICAL MOVEMENT

Filed Nov. 20, 1945     2 Sheets-Sheet 1

INVENTOR.
AUGUST H. HEINRICH.
BY Bates, Teare & McBean.
Attorneys.

Jan. 16, 1951     A. H. HEINRICH     2,538,620
MECHANICAL MOVEMENT

Filed Nov. 20, 1945     2 Sheets-Sheet 2

INVENTOR.
AUGUST H. HEINRICH.
BY Bates, Teare & McBean
Attorneys.

Patented Jan. 16, 1951

2,538,620

UNITED STATES PATENT OFFICE 2,538,620

MECHANICAL MOVEMENT

August H. Heinrich, Euclid, Ohio, assignor to Metal Seal and Products, Inc., Cleveland, Ohio, a corporation of Ohio Application November 20, 1945, Serial No. 629,760

17 Claims. (Cl. 74—70)

This invention relates to a mechanical movement for imparting rotary-oscillatory motion to a driven member.

The movement may be provided as a unitary self-contained device having input and output shafts and interposable between a source of power, such as a motor or hand crank, and the element to be driven, these being connected to the respective shafts. Alternatively, the movement may be incorporated in the drive mechanism of a machine, such as a machine tool.

The need for such a mechanical movement has long been felt in a variety of endeavors. Two widely variant examples being the lapping and honing art, and the washing machine art. In lapping, as practiced, for example, in the fitting of gasoline engine valves to their seats, a lapping compound is introduced between the parts which are then pressed together. Relative motion is then imparted whereby the parts grind each other away until a true fit is obtained between them. The relative motion is preferably not a uniform continuous rotary one as some of the particles in the compound, more adamant than the rest, tend to become imbedded in one of the parts, and continuous rotation results in deep scoring of the other part. It is desirable, therefore, to reverse the motion frequently in order to obtain a new distribution of the compound. These reversals should not occur each time the parts come to the same relative position as a pattern of scoring would thus be produced due to the periodicity.

In the case of a washing machine having an agitator the problem is to so move the agitator as to produce a constant redistribution of the clothes without tangling them with each other and with the agitator. Here also it is desirable not to set up a frequently repeated pattern in the motion.

An object of the present invention is to provide a mechanical movement which will produce a proper motion for the foregoing and other cases.

This object I accomplish with a simple gear train and crank movement wherein, while the input shaft is driven at a constant uniform rate, the output shaft is caused to turn at a reduced and variable rate in a forward direction interrupted by frequent reversals, the angles described during the forward movements being greater than those described during the reversals whereby the summation is a forward advancement. The points at which the reversals take place during a complete revolution are not repeated until after a comparatively large number of revolutions have taken place. I have found that this type of motion produces practically the same result as the ideal random motion and may be accomplished with a simple arrangement of few and rugged parts.

Figure 3:
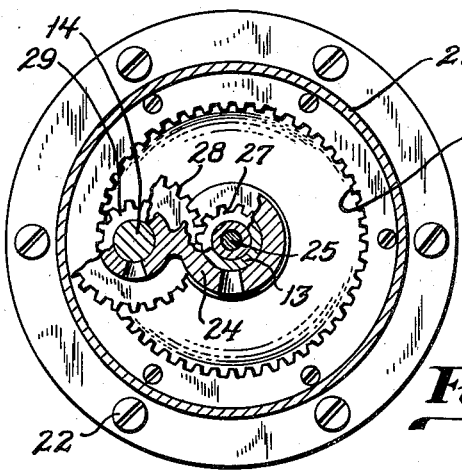
Figure 4:
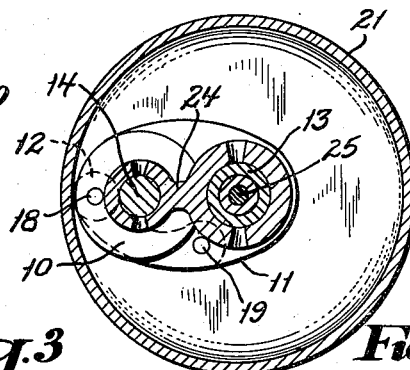
Figure 5:
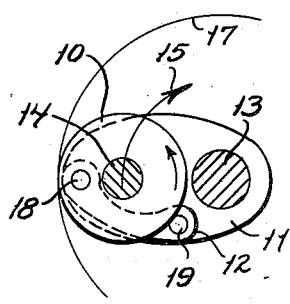
Figure 6:
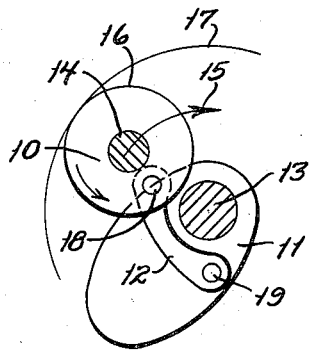
Figure 7:
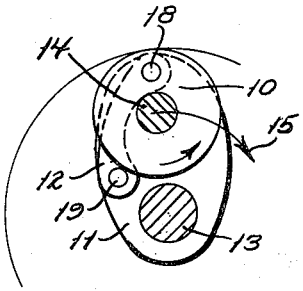
Figure 8:
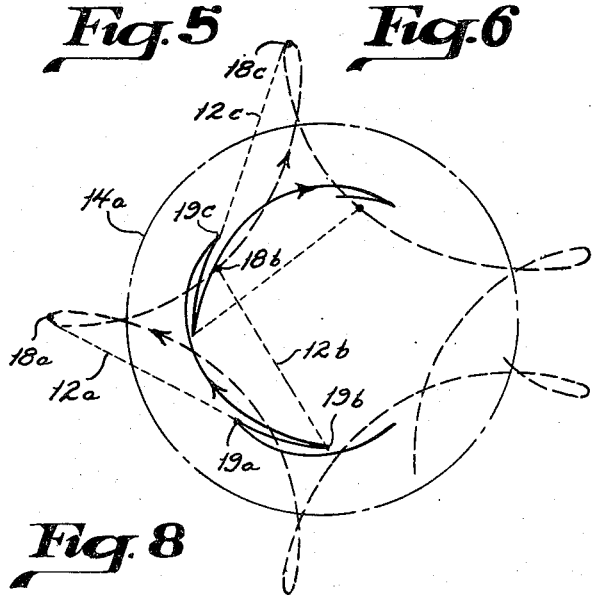
Figure 9:
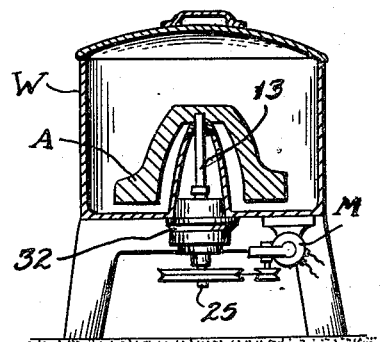

In the drawings, Fig. 1 is an elevational view of a preferred embodiment of my device as interposed between a source of power and the work to be moved, in this case a setup for valve grinding; Fig. 2 is a longitudinal medial section through the movement; Fig. 3 is a transverse section taken on the line 3—3 of Fig. 1; Fig. 4 is a transverse section taken on the line 4—4 of Fig. 1; Figs. 5, 6 and 7 are diagrammatic representations of some of the parts of the movement and illustrate respectively progressive positions of the parts; Fig. 8 is a motion diagram; and Fig. 9 is a cross sectional view of a washing machine illustrating an alternative adaptation of the device.

Referring first to the diagrams of Figs. 5, 6 and 7, it will be seen that the underlying principle of my mechanical movement is the interaction between two cranks 10 and 11 and a link 12 between them. The crank 11 is drivingly carried by the output shaft 13 while the crank 10 is drivingly carried by a shaft 14 which, while rotatable upon its own axis, is revolvable about the output shaft as indicated by the arrow 15. If the shaft 14 were to remain fixed in position while rotating on its axis, the crank 11 would be oscillated thereby through a fraction of a revolution. On the other hand, if the shaft 14 were to swing around the output shaft as indicated by the arrow 15 without rotating on its axis relative to the output shaft, the entire assemblage, including the output shaft, would rotate as a unit. By causing the shaft 14 to rotate, as it revolves about the output shaft, the latter is given a motion which is a combination of the two results and which may be referred to as a rotary-oscillatory motion, substantially as indicated by the heavy line in the diagram of Fig. 8. To better illustrate the double movement of the crank 10 I have shown it in the diagrams of Figs. 5, 6 and 7 as a roller 16 engaging a curved trackway 17.

In Fig. 8 the circle is a plot of the path of the shaft 14, the long dashes the path of the crank pin 18, and the heavy line the path of the crank pin 19. The short dashes represent progressive positions of the link 12. It will be understood that the path of the crank pin 19 has been distorted from the circular in order to show the reversals of movement. As the parts reach the positions illustrated in Fig. 5, their points in Fig. 8 are at 18a, 12a and 19a, where it is seen that the forward travel of the pin 19, and hence of the output shaft, has been temporarily stopped. While the pin 18 is progressing to its position of Fig. 6 the link 12 pushes the pin 19 in a reverse direction until the positions 18b, 12b and 19b are reached. Continued forward motion of the pin 18 then advances the pin 19, by means of the link 12, until the positions 18c, 12c and 19c are reached, at which time there is another reversal of the motion of pin 19. The rotation of the output shaft is much slower during the reversals than during the forward travel, as will be seen from the fact that the distance traveled between the points 19a and 19b is approximately one-third of the distance from 19b to 19c although the duration of these two movements is approximately equal, as attested by the fact that the point 18b is about midway between 18a and 18c. This slow reversal is advantageous in a lapping operation, for example, as it allows a better redistribution of the compound. Another attribute of the motions, both forward and reverse, which is advantageous in reducing the throwing of the compound from the parts, is the temporary lull as the crank 10 passes dead center and the gradual increase and then decrease of speed as it approaches the succeeding dead center.

Though making possible a simpler mechanical design of the parts, it is not essential that the path of travel of the shaft 14 be a circle, or that such circle be concentric with the output shaft. In fact, any departure from the concentric produces a more random distribution of the reversals and greater variations in the speeds, and, in breaking up the regularity of the pattern of motion, produces a more advantageous result.

While the mechanical movement of my invention may be incorporated in the driving mechanism of a machine, I have found that it may also be produced as a unitary device with its own housing, and that in this form it may advantageously be used in a large variety of applications. An embodiment of this form is illustrated in the drawings. The housing comprises an upper cup-shaped member 20 and a lower cup-shaped member 21, the open edges of which are secured together as by the screws 22. An output shaft 13 is journaled in the housing section 21 and may be provided with an appropriate packing gland 23. Drivingly secured to the shaft is a crank 11 carrying a crank pin 19. An arm 24 is freely journaled at its one end on the output shaft and at its other end carries a planetary shaft 14 which is journaled in the arm and is constrained by it to a path concentric with the output shaft. A link 12 interconnects a crank pin 18, on a crank 10 drivingly secured to the planetary shaft, and the pin 19 on the crank 11. I prefer to extend the cranks 10 and 11 into flat plates of circular and oval shape respectively, as illustrated, to confine the link 12. A simplification of design is thus obtained as the crank pins may be simple studs upon which the link is slipped. The parts so far described are those illustrated diagrammatically in Figs. 5 to 7, and hence are adapted to produce motion of the output shaft similar to that previously described.

Rotation and forward progression of the planetary shaft is obtained by means of a gear train. An input shaft 25 is journaled in the housing section 20 and may have a further bearing in a counterbore of the output shaft to preserve stability and axial alignment and spacing of the parts. Integral with or drivingly secured to the input shaft 25 is a sun gear or pinion 27 meshing with a planetary gear 28 keyed to the planetary shaft 14. Rotation of the planetary shaft produced by means of this gear couple causes forward progression of the planetary shaft by means of a pinion 29 which is keyed to the shaft and which meshes with an internal gear 30 secured to the housing. Thus these parts just described are adapted to produce the double motion of the planetary shaft illustrated by the arrows in Figs. 5 to 7.

The frequency of repetition of the reversal pattern in this embodiment is controlled by the ratio between the gears 29 and 30. I have found it convenient to use a gear 29 having 11 teeth and an internal gear 30 having 48 teeth. In such a case 48 reversals are produced before they again take place at the same point in the revolution of the output shaft, the latter rotating 11 times in the meanwhile.

In Fig. 1, I have illustrated the present embodiment as it might be used in the operation of valve grinding. As there shown, the input shaft 25 is clamped in the chuck C of a drill press, for example, and to the output shaft 13 is clamped an appropriate tool T. The tool may be provided with a blade-like portion for engagement with an appropriate slot in the valve V for pressing and turning it upon the valve seat S. Alternatively, the output shaft could be provided with a rubber suction cup for engagement with the valve head. The housing of the device may be fixed in position by means of a bracket B extending from the frame of the machine and clamping upon a boss 31 of the housing, thus preventing its rotation.

Another adaptation of my mechanical movement is illustrated in Fig. 9 which is a simplified showing of a washing machine. The housing 32 is intended to resemble that of Figs. 1 and 2 and will be understood to contain a mechanical movement similar to that which is there shown. The input shaft 25 is driven, through any appropriate means, by a motor M while the output shaft 13 drivingly carries the agitator A of the washing machine. The agitator thus partakes of the described motion of the output shaft and an advantageous result is obtained in the movement of the clothes in the operation of the machine.

While I have illustrated a specific embodiment of my invention I do not wish to be limited thereby, as numerous changes and modifications, some of which have been here mentioned and others of which will be apparent to one skilled in the art, may be made without departing from the spirit and scope of my invention.

I claim:

1. A mechanical movement for imparting rotary-oscillatory motion to an output shaft comprising a crank on the shaft, a second crank on a planetary shaft, a link pivotally secured to each of said cranks, a fixed internal gear coaxial with the output shaft, a planetary gear drivingly carried by the planetary shaft and meshing with the internal gear, and means for moving the planetary gear in a path concentric with the output shaft.

2. A mechanical movement for imparting rotary-oscillatory motion to an output shaft comprising an input shaft, an output shaft concentric therewith, a fixed internal gear, a sun gear driven by the input shaft, a planetary shaft geared to the internal gear and sun gear, a crank on the planetary shaft, a second crank on the output shaft, and a link between the cranks.

3. A mechanical movement for imparting rotary-oscillatory motion to an output shaft comprising an input shaft, an output shaft, a fixed internal gear, a sun gear driven by the input shaft, an arm freely rotatable concentric with the input shaft, a planetary shaft journaled in the arm and geared to the internal gear and sun gear, a crank on the planetary shaft, a second crank on the output shaft, and a link between the cranks.

4. A mechanical movement for imparting rotary oscillatory motion to an output shaft comprising an input shaft, an output shaft, a fixed gear concentric with the input shaft, a sun gear driven by the input shaft, a planetary shaft geared with both said fixed gear and said sun gear, a crank on the planetary shaft, a second crank on the output shaft and a connection between said cranks.

5. A driving mechanism for a washing machine having a frame, motor and agitator, said driving mechanism comprising a driving member adapted to be connected to the motor, a driven member adapted to be connected to the agitator, a crank on the driven member, an intermediate rotatable member, a second crank on the intermediate member, a link connecting the cranks, a sun gear on the driving member, a meshing planet on the intermediate member, a fixed internal gear and a pinion on the intermediate member meshing with the internal gear.

6. A mechanical movement for imparting rotary-oscillatory motion to an output shaft comprising a crank on the shaft, a second crank on a second shaft, a link pivotally secured to each of said cranks, a fixed gear, a planetary gear drivingly carried by the second shaft and meshing with said fixed gear, and means for moving the planetary gear relative to said fixed gear.

7. A mechanical movement for imparting rotary-oscillatory motion from a constantly rotating input shaft to an output shaft comprising a crank on the output shaft, an arm freely rotatable about the axis of the input shaft, a planetary shaft freely rotatable on the arm, a second crank drivingly carried by the planetary shaft, a link between the cranks, a fixed gear concentric with the input shaft, and a planetary gear drivingly carried by the planetary shaft and meshing with the fixed gear.

8. A lapping tool comprising a rotary driving member connected to a power source, a driven member adapted to turn the work to be lapped, a housing supporting the members, a crank within the housing and secured to the driven member, an intermediate member rotatable about an axis eccentric to the axis of a driving member, a second crank on said intermediate member, a link between the cranks, a sun gear on the driving member, and a meshing planet on the intermediate member to rotate the intermediate member about its own axis, and means operating consequent upon the rotation of said gears to cause said intermediate member to revolve about the axis of the driving member simultaneously with the rotation of the intermediate member.

9. A mechanical movement comprising a casing adapted to be held stationary, an input shaft and an output shaft each extending from within the casing to a region exterior thereof, a fixed gear in the casing, a sun gear in the casing driven by the input shaft, a planetary shaft within the casing carrying two pinions one of which is geared to said fixed gear and the other to said sun gear, a crank on the planetary shaft, a second crank on the output shaft, the crank arm of the second crank being greater than the crank arm of the first crank, and a link connecting said two cranks.

10. In a mechanical movement, the combination of an input shaft adapted to be continuously rotated, an output shaft, means drivingly connecting said shafts and operating to rotate the output shaft in a forward direction and then in a reverse direction alternately, said means comprising a fixed gear in the casing, a sun gear in the casing driven by the input shaft, a planetary shaft within the casing geared to said fixed gear and the sun gear, a crank on the planetary shaft, a second crank on the output shaft, the crank arm of the second crank being greater than the crank arm of the first crank, and a link connecting said two cranks, whereby the angular movement in one of said directions is greater than that in the opposite direction and the summation constitutes an advance in one direction, the gear ratios being such that the points at which the reversals occur are not repeated until after several complete rotations of the output shaft.

11. A transmission device comprising a driving member, a driven member in axial alignment therewith, a coupling comprising a crank in alignment with said members and connected to the driven member, a second crank having a lesser throw than the first and a link connecting the cranks together, a shaft carrying the second crank and adapted to be rotated on its own axis and revolved about the axis of the driving member by the latter, a stationary gear wheel concentric of the driving member, a gear wheel fast on the crank shaft meshing with the stationary gear wheel for causing the crank shaft to rotate as it revolves about the axis of the driving member, for the purpose of causing automatically positive and negative accelerations of the driven member with reference to the driving member.

12. A transmission device comprising a driving member, a driven member, a revoluble member, a stationary gear wheel and a crank, all in axial alignment, a shaft rotatably mounted parallel to the axis thereof, a gear wheel fast on the shaft, meshing with the stationary gear wheel, for causing the shaft to rotate about its own axis as said revoluble member revolves, a crank on the shaft, with a smaller throw than the first crank, a link connecting the two cranks together for the purpose of causing automatically positive and negative accelerations of the driven member.

13. Means for driving a tool, comprising a fixed casing, a gear fixed to the casing, a driving spindle journaled in the casing, a driven member in the casing in axial alignment with the driving spindle, a revoluble member coaxial with the spindle and enclosed in the casing, a shaft mounted in said revoluble member, a planetary wheel keyed to the shaft and meshing with said fixed gear and thereby rotating the shaft, a crank freely mounted axially of the driving spindle, a second crank of smaller throw than the first carried by the planetary shaft, and a link connecting the two cranks together for the purpose of causing automatically alternate positive negative accelerations of the tool holder with reference to the driving spindle.

14. A mechanical movement for imparting rotary oscillatory motion to an output shaft comprising an input shaft, an output shaft, the two shafts being in axial alignment, and mechanism interconnecting the shafts and comprising a driving crank connected by a link to a larger driven crank and operating upon continuous rotation of the input shaft to rotate the output shaft alternatively in a forward direction and then in a reverse direction, the angular extent of one of the movements of the output shaft being greater than that of the opposite movement of the output shaft.

15. A mechanical movement for imparting rotary oscillatory movement to an output shaft comprising an input shaft, an output shaft, a housing supporting said shafts, and mechanism within the housing for connecting said shafts together, said mechanism comprising a fixed internal gear in the casing, a sun gear in the casing driven by the input shaft, a planetary shaft within the casing carrying two gears respectively meshing with said internal gear and with said sun gear, a crank on the planetary shaft, a second crank on the output shaft, the crank arm of the second crank being greater than the crank arm of the first crank, and a link connecting said two cranks, whereby said mechanism operates upon continuous rotation of the input shaft to rotate the output shaft alternately in a forward and then in a reverse direction with the angular movement in each forward direction being greater than that of the reverse direction.

16. A mechanical movement for imparting rotary oscillatory motion to an output shaft from a continuously rotating input shaft comprising a hollow casing, output and input shafts aligned with each other and extending from the exterior into the interior of the casing and journaled in the casing, a sun gear on the input shaft, a stationary gear carried by the casing concentric of the axis of the shafts, a member below the sun gear freely surrounding said axis and rotatable independently of both shafts, a planetary shaft journaled in said member, two gears on the planetary shaft, one meshing with the sun gear and the other with said fixed gear, a crank on said planetary shaft below said member, a crank on the upper end of the output shaft and a link connecting said two cranks.

17. A mechanical movement comprising a hollow casing, aligned driving and driven shafts projecting into the casing from opposite directions, a sun gear on the driving shaft, a stationary internal gear in the casing coaxial with said shafts, a member in the casing revoluble about the axis of the shafts, a planetary shaft journaled in said member, two gears on the planetary shaft meshing respectively with said sun gear and said stationary gear, a crank on the planetary shaft, a longer crank on the driven shaft, and a link connecting said cranks, whereby a continuous rotation of the driving shaft causes alternately a forward and reverse direction of movement of the driven shaft, the amount of forward movement being greater than that of the reverse movement, said gearing being such that the reversals occur at non-aliquot fractions of the complete circle of movement of the driven shaft whereby the pattern of reversals is not repeated until after several complete rotations of the output shaft.

AUGUST H. HEINRICH.

REFERENCES CITED

The following references are of record in the file of this patent:

UNITED STATES PATENTS

| Number | Name | Date |
|---|---|---|
| 377,133 | Arnold | Jan. 31, 1888 |
| 634,194 | Woodward | Oct. 3, 1899 |
| 1,126,602 | Whitney | Jan. 26, 1915 |
| 1,387,697 | Edwards | Aug. 16, 1921 |
| 2,296,892 | Andrew | Sept. 29, 1942 |
| 2,374,718 | Andrew | May 1, 1945 |
| 2,403,233 | Patch | July 2, 1946 |